(12) United States Patent
Takeya et al.

(10) Patent No.: US 12,391,122 B2
(45) Date of Patent: Aug. 19, 2025

(54) BRAKING CONTROL DEVICE

(71) Applicant: ADVICS CO., LTD., Kariya (JP)

(72) Inventors: Hirotaka Takeya, Kariya (JP); Terushige Uraoka, Kariya (JP)

(73) Assignee: ADVICS CO., LTD., Kariya (JP)

( * ) Notice: Subject to any disclaimer, the term of this patent is extended or adjusted under 35 U.S.C. 154(b) by 358 days.

(21) Appl. No.: 17/776,982

(22) PCT Filed: Nov. 20, 2020

(86) PCT No.: PCT/JP2020/043317
§ 371 (c)(1),
(2) Date: May 13, 2022

(87) PCT Pub. No.: WO2021/100840
PCT Pub. Date: May 27, 2021

(65) Prior Publication Data
US 2022/0410721 A1 Dec. 29, 2022

(30) Foreign Application Priority Data
Nov. 20, 2019 (JP) .................................. 2019-209601

(51) Int. Cl.
*B60L 7/26* (2006.01)

(52) U.S. Cl.
CPC .............. *B60L 7/26* (2013.01); *B60L 2240/12* (2013.01); *B60L 2240/14* (2013.01); *B60L 2240/642* (2013.01)

(58) Field of Classification Search
CPC .... B60L 7/26; B60L 2240/12; B60L 2240/14; B60L 2240/642; B60T 13/741; B60T 2201/04
See application file for complete search history.

(56) References Cited

U.S. PATENT DOCUMENTS

2010/0100295 A1    4/2010  Inoue et al.
2011/0240418 A1*  10/2011  Tachiiri ................. B60T 13/588
                                                           188/72.4

FOREIGN PATENT DOCUMENTS

CN        110341496 A  * 10/2019  .......... B60L 15/2018
DE     102018218472 A1 *  4/2020
(Continued)

OTHER PUBLICATIONS

International Search Report (PCT/ISA/210) with translation and Written Opinion (PCT/ISA/237) mailed on Dec. 15, 2020, by the Japan Patent Office as the International Searching Authority for International Application No. PCT/JP2020/043317. (8 Pages).

*Primary Examiner* — Vishal R Sahni
(74) *Attorney, Agent, or Firm* — BUCHANAN INGERSOLL & ROONEY PC

(57) ABSTRACT

The present disclosure is, for example, a braking control device for application in a vehicle. The braking control device includes: a hydraulic brake device that presses a braking member using hydraulic pressure toward a braked member that rotates integrally with a wheel to generate hydraulic braking force; and an electric brake device that presses the braking member using driving force of a motor toward the braked member to generate electric braking force. The braking control device adjusts the hydraulic braking force so that a vehicle speed falls within a target vehicle speed range while the vehicle is traveling on a downhill road, and replaces the hydraulic braking force with the electric braking force when at least one of the vehicle speed and the hydraulic pressure is stabilized.

5 Claims, 7 Drawing Sheets

(56) References Cited

FOREIGN PATENT DOCUMENTS

| | | | | |
|---|---|---|---|---|
| DE | 102019200955 A1 | * | 7/2020 | .............. B60T 1/065 |
| JP | 2008273387 A | | 11/2008 | |
| JP | 2014196041 A | * | 10/2014 | ............ B60T 13/588 |

* cited by examiner

BRAKING CONTROL DEVICE

TECHNICAL FIELD

The present disclosure relates to a braking control device.

BACKGROUND ART

In recent years, electric parking brakes have been widely adopted for various vehicles such as passenger cars. An electric parking brake is also referred to as an electric parking brake (EPB) or an electric brake device. A braking control device that controls the EPB generates electric braking force by driving a wheel brake mechanism using a motor, for example.

In a case where a vehicle travels on a downhill road (downward slope), there is a possibility that wheel slip or locking will occur when normal braking control is performed. As a countermeasure, there is downhill assist control (DAC) braking control. In DAC, braking force is controlled so as to avoid wheel slip or locking, and the vehicle speed is maintained within a target vehicle speed range. As a result, the driver can concentrate on steering operation with a sense of security.

Generally, when comparing hydraulic braking force to electric braking force, hydraulic braking force is superior in responsiveness. Therefore, in the case of a vehicle including a wheel brake mechanism capable of generating both hydraulic braking force and electric braking force, DAC uses hydraulic braking force.

CITATIONS LIST

Patent Literature

Patent Literature 1: JP 2008-273387 A

SUMMARY

Technical Problems

However, in the prior art described above, since it is necessary to control braking force according to a traveling state including the speed and acceleration of the vehicle during DAC, it is necessary to continuously actuate the motor of a hydraulic brake device. As such, the hydraulic brake device may overheat due to continuous actuation for an extended period.

Therefore, one of the problems of the present disclosure is to provide a braking control device capable of suppressing overheating of the hydraulic brake device during DAC in a vehicle equipped with both a hydraulic brake device and an electric brake device.

Solutions to Problems

The present disclosure is, for example, a braking control device for application in a vehicle. The braking control device includes: a hydraulic brake device that presses a braking member using hydraulic pressure toward a braked member that rotates integrally with a wheel to generate hydraulic braking force; and an electric brake device that presses the braking member using driving force of a motor toward the braked member to generate electric braking force. The braking control device adjusts the hydraulic braking force by controlling the hydraulic brake device so that a vehicle speed falls within a target vehicle speed range while the vehicle is traveling on a downhill road. When at least one of the vehicle speed and the hydraulic pressure is stabilized, the braking control device controls the hydraulic brake device and the electric brake device to replace the hydraulic braking force with the electric braking force.

DESCRIPTION OF EMBODIMENT

The following discloses an exemplary embodiment of the present disclosure. A configuration of the embodiment described below, and actions and results (effects) brought about by the configuration are examples. The present disclosure can also be realized by configurations other than that disclosed in the following embodiment. Furthermore, according to the present disclosure, at least one of the various effects (including derivative effects) obtained by the following configuration can be obtained.

Figure 1:
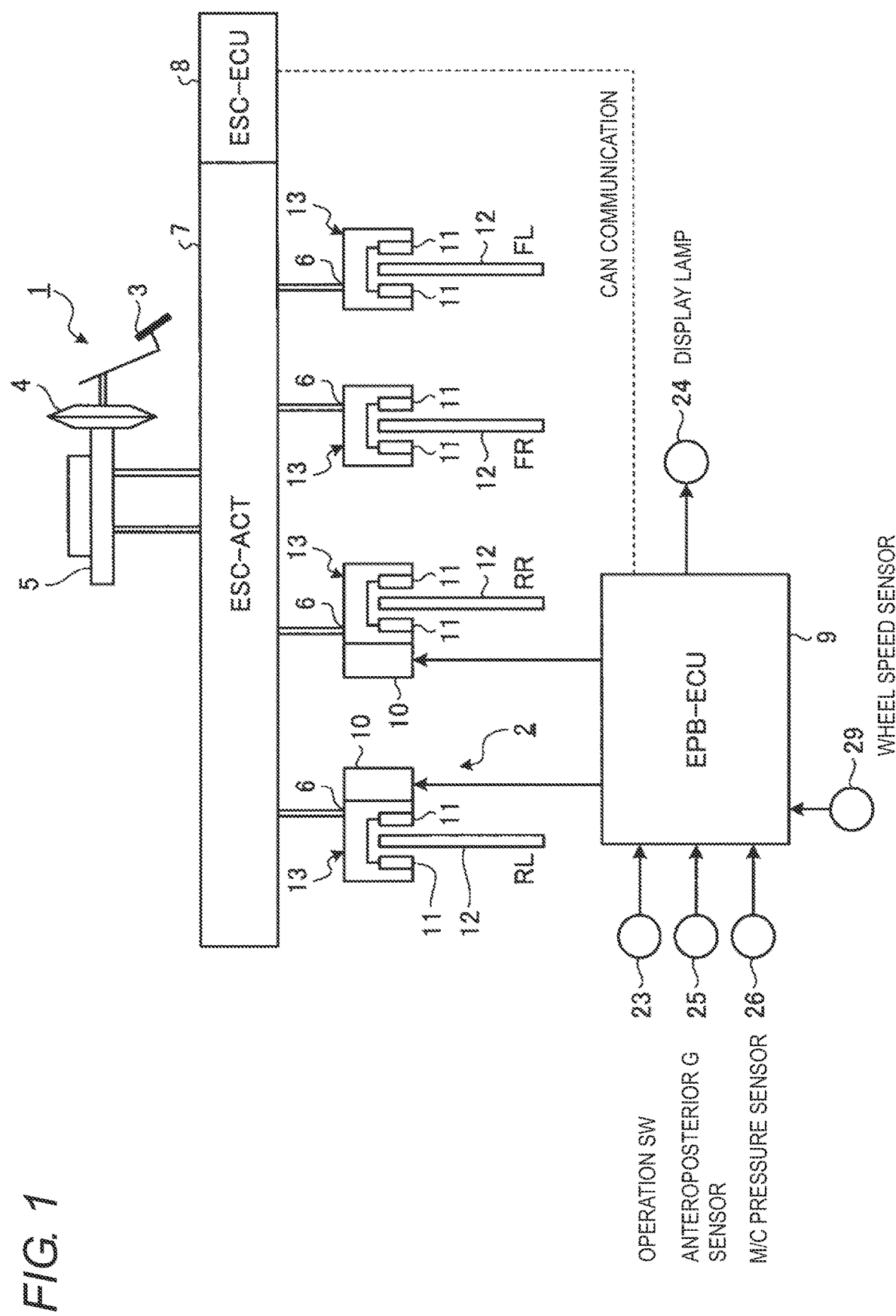
FIG. 1 is a schematic diagram illustrating an overall outline of a vehicle brake device of an embodiment.
Figure 2:
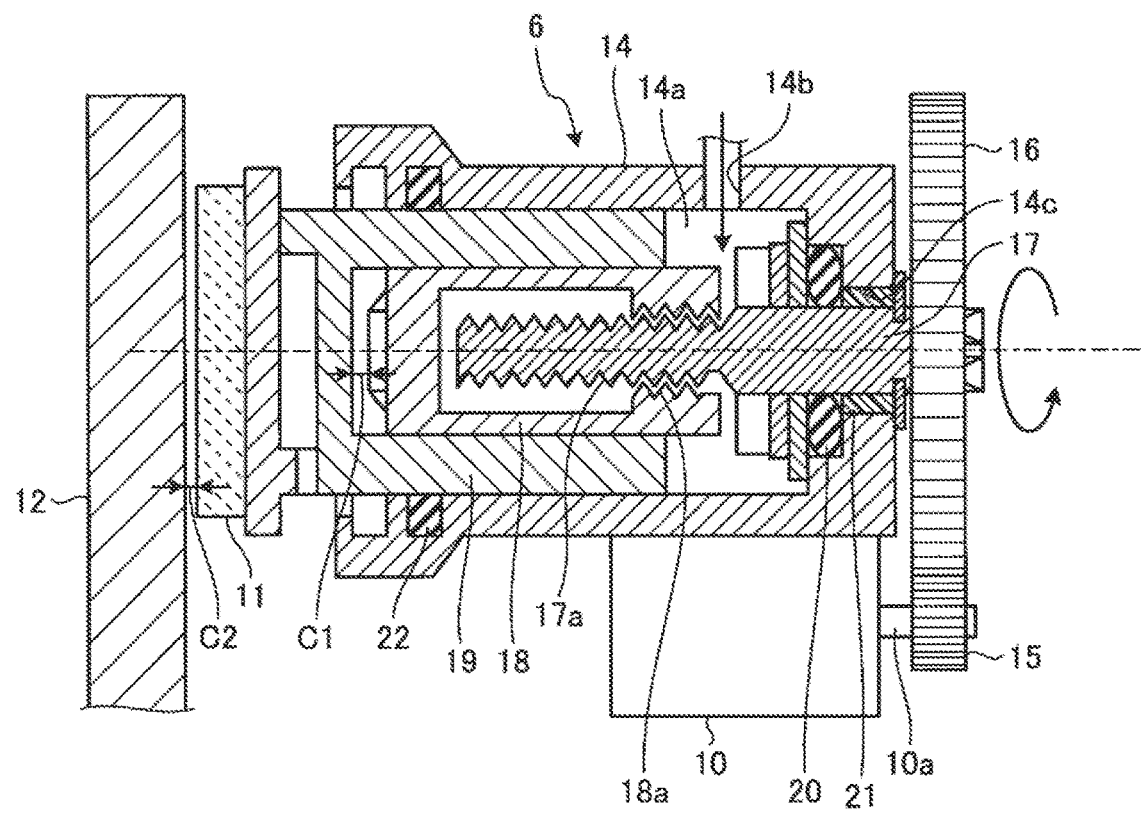
FIG. 2 is a schematic cross-sectional view of a rear wheel brake mechanism provided in the vehicle brake device of the embodiment.

In the embodiment, a vehicle brake device in which a rear wheel EPB disc brake is applied is described as an example. FIG. 1 is a schematic diagram illustrating an overall outline of the vehicle brake device of the embodiment. FIG. 2 is a schematic cross-sectional view of a rear wheel brake mechanism provided in the vehicle brake device of the embodiment. The following description makes reference to these drawings.

As illustrated in FIG. 1, the vehicle brake device of the embodiment includes a hydraulic brake device with a service brake 1, and an EPB 2 (electric brake device).

The service brake 1 is a hydraulic brake mechanism (hydraulic brake device) that generates service braking force by pressing a braking member (brake pad 11 in FIG. 2) using hydraulic pressure toward a braked member (brake disc 12 in FIG. 2) that rotates integrally with a wheel based on depression of a brake pedal 3 by a driver. Specifically, the service brake 1 boosts depression force corresponding to the depression of the brake pedal 3 by the driver through a booster device 4, and then generates brake hydraulic pressure corresponding to the boosted depression force in a master cylinder (M/C) 5. The brake hydraulic pressure is then transmitted to a wheel cylinder (W/C) 6 provided in a wheel brake mechanism of each wheel to generate service braking force. An electronic stability control (ESC)-ACT 7 for brake hydraulic pressure control is provided between the M/C 5 and the W/C 6. The ESC-ACT 7 adjusts the service braking force generated by the service brake 1. The ESC-ACT 7 performs various control including anti-skid control for improving vehicle safety. In addition, the ESC-ACT 7 can generate hydraulic braking force according to a command from an ESC-ECU 8 or an EPB-ECU 9 during DAC or the like, even without the driver depressing the brake pedal 3.

The various controls using the ESC-ACT 7 are performed due to instructions from the ESC-ECU 8 (braking control device) or the EPB-ECU 9 that control hydraulic braking force. For example, the ESC-ECU 8 outputs a control current for controlling various unillustrated control valves and an unillustrated pump driving motor included in the ESC-ACT 7, thereby controlling a hydraulic pressure circuit included in the ESC-ACT 7 and controlling W/C pressure transmitted to the W/C 6. As a result, wheel slip is avoided, and vehicle safety is improved.

For example, the ESC-ACT 7 includes, for each wheel, elements such as a pressure increase control valve that controls application of the brake hydraulic pressure generated in the M/C 5 or the brake hydraulic pressure generated by pump drive to the W/C 6 and a pressure decrease control valve that reduces W/C pressure by supplying brake fluid in each W/C 6 to a reservoir, and is configured to be capable of controlling increase, hold, and reduction of the W/C pressure. In addition, the ESC-ACT 7 can realize an automatic pressurization function of the hydraulic brake device, and can automatically pressurize the W/C 6 based on control of the pump drive and various control valves even in a state where there is no brake operation.

The EPB 2 generates an electric braking force by driving the wheel brake mechanism using a motor 10. The EPB 2 includes an EPB-ECU 9 (braking control device) that controls driving of the motor 10. For example, the EPB 2 presses the braking member (brake pad 11 in FIG. 2) toward the braked member (brake disc 12 in FIG. 2) by driving the motor 10 and generates electric braking force so that the vehicle does not move unintentionally when parked. The EPB-ECU 9 and the ESC-ECU 8 perform controller area network (CAN) communication, for example. Furthermore, the EPB-ECU 9 and the ESC-ECU 8 may be configured separately or integrally.

A wheel brake mechanism is a mechanical structure that generates braking force in the vehicle brake device of the present embodiment. A front wheel brake mechanism has a structure which generates hydraulic braking force through actuation of the hydraulic brake device. By contrast, a rear wheel brake mechanism has a common use structure that generates braking force for both actuation of the hydraulic brake device and operation of the EPB 2. The front wheel brake mechanism does not have a mechanism that generates electric braking force based on the operation of the EPB 2. Since this is a wheel brake mechanism that has been generally used heretofore, description thereof is omitted here, and the rear wheel brake mechanism is described below.

In the rear wheel brake mechanism, the brake pad 11 illustrated in FIG. 2 which is a friction material is pressed not only when the hydraulic brake device is actuated but also when the EPB 2 is actuated, and the brake disc 12 (12 RL, 12 RR, 12 FR, and 12 FL) which is a friction target material is pinched by the brake pad 11, thereby generating frictional force, that is, braking force, between the brake pad 11 and the brake disc 12.

In a caliper 13 illustrated in FIG. 1, the wheel brake mechanism rotates a spur gear 15 included in a drive shaft 10*a* of the motor 10 by driving the motor 10 to press the brake pad 11 as illustrated in FIG. 2. The motor 10 is directly fixed to a body 14 of the W/C 6. The rotational force (output) of the motor 10 is then transmitted to a spur gear 16 meshed with the spur gear 15 to move the brake pad 11. From this, electric braking force is generated by the EPB 2.

In addition to the W/C 6 and the brake pad 11, a part of an edge surface of the brake disc 12 is accommodated in the caliper 13 so as to be pinched by the brake pad 11. The W/C 6 introduces brake hydraulic pressure into a hollow portion 14*a* of the cylindrical body 14 through a passage 14*b*, thereby generating W/C pressure in the hollow portion 14*a* which is a brake fluid storage chamber. Elements such as a rotating shaft 17, a propulsion shaft 18, and a piston 19 are provided in the hollow portion 14*a*.

One end of the rotating shaft 17 is connected to the spur gear 16 through an insertion hole 14*c* formed in the body 14. The rotating shaft 17 rotates along with the rotation of the spur gear 16. A male screw groove 17*a* is formed in an outer peripheral surface of the rotating shaft 17 at an end portion of the rotating shaft 17 opposite to the end portion connected to the spur gear 16. By contrast, the other end of the rotating shaft 17 is pivotally supported by being inserted into the insertion hole 14*c*. Specifically, the insertion hole 14*c* is provided with an O-ring 20 and a bearing 21. The O-ring 20 prevents the brake fluid from leaking from a gap between the rotating shaft 17 and the inner wall surface of the insertion hole 14*c*. The bearing 21 axially supports the other end of the rotating shaft 17.

The propulsion shaft 18 is formed of a nut made of a hollow cylindrical member, and has an inner wall surface provided with a female screw groove 18*a* to be meshed with the male screw groove 17*a* of the rotating shaft 17. The propulsion shaft 18 is formed in a columnar shape or a polygonal columnar shape provided with a key for preventing rotation for example, and thus has a structure which cannot be rotated about the rotation center of the rotating shaft 17 even when the rotating shaft 17 rotates. Therefore, when the rotating shaft 17 is rotated, the rotational force of the rotating shaft 17 is converted into a force for moving the propulsion shaft 18 in the axial direction of the rotating shaft 17 through the engagement between the male screw groove 17*a* and the female screw groove 18*a*. When the driving of the motor 10 is stopped, the propulsion shaft 18 is stopped at the same position by frictional force due to the meshing between the male screw groove 17*a* and the female screw groove 18*a*. When the driving of the motor 10 is stopped upon reaching a target electric braking force, the propulsion shaft 18 is held at that position, and a desired electric braking force can be held to achieve self-lock (hereinafter, simply referred to as "lock").

The piston 19 is disposed so as to surround the outer periphery of the propulsion shaft 18, is formed of a bottomed cylindrical member or polygonal cylindrical member, and is disposed so that an outer peripheral surface thereof is in contact with an inner wall surface of the hollow portion 14*a* formed in the body 14. A seal member 22 is provided on the inner wall surface of the body 14 so as not to cause brake fluid leakage between the outer peripheral surface of the piston 19 and the inner wall surface of the body 14, and a structure capable of applying W/C pressure to the end surface of the piston 19 is adopted. The seal member 22 is used to generate a reaction force to pull the piston 19 back at the time of release control after lock control. Basically, since the seal member 22 is provided, even if the brake pad 11 and the piston 19 are pushed by the inclined brake disc 12 within a range not exceeding an elastic deformation amount of the seal member 22 while turning, they can be pushed back to the brake disc 12 side so that the brake disc 12 and the brake pad 11 are held with a predetermined clearance (clearance C2 in FIG. 2) therebetween.

In a case where the propulsion shaft 18 is provided with a key for preventing rotation so as not to rotate about the rotation center of the rotating shaft 17 even when the rotating shaft 17 rotates, the piston 19 is provided with a key groove in which the key is slid. In a case where the propulsion shaft 18 is formed in a polygonal columnar shape, the piston 19 is formed in a polygonal cylindrical shape corresponding to the shape of the propulsion shaft 18.

The brake pad 11 is disposed at a distal end of the piston 19, and the brake pad 11 is moved in a horizontal direction in the drawing along with the movement of the piston 19. Specifically, the piston 19 is configured to be movable leftward in the drawing along with the movement of the propulsion shaft 18, and to be movable leftward in the drawing independently of the propulsion shaft 18 due to application of W/C pressure to an end portion of the piston 19 (an end portion opposite to the end portion where the brake pad 11 is disposed). When the propulsion shaft 18 is at a release position (a state before the motor 10 is rotated), which is a standby position during normal release, and the brake hydraulic pressure in the hollow portion 14a is not applied (W/C pressure=0), the piston 19 is moved rightward in the drawing due to elastic force of the seal member 22 described later, and the brake pad 11 is separated from the brake disc 12.

When the motor 10 is rotated and the propulsion shaft 18 is moved from its initial position leftward in the drawing, the movement of the piston 19 rightward in the drawing is restricted by the moved propulsion shaft 18 even if the W/C pressure becomes 0, and the brake pad 11 is held at that place. A clearance C1 in FIG. 2 indicates a distance between the distal end of the propulsion shaft 18 and the piston 19. After release completion of the EPB 2, the propulsion shaft 18 is fixed in position with respect to the body 14.

In the wheel brake mechanism configured as above, when the hydraulic brake device is actuated, the piston 19 is moved leftward in the drawing based on the W/C pressure generated by the actuation of the hydraulic brake device, so that the brake pad 11 is pressed against the brake disc 12 to generate hydraulic braking force. When the EPB 2 is operated, the spur gear 15 is rotated by driving the motor 10, and the spur gear 16 and the rotating shaft 17 are rotated accordingly. Therefore, the propulsion shaft 18 is moved to the side of the brake disc 12 (leftward in the drawing) based on the meshing between the male screw groove 17a and the female screw groove 18a. Along with this, the distal end of the propulsion shaft 18 then comes into contact with the piston 19 to press the piston 19, and the piston 19 is also moved in the same direction so that the brake pad 11 is pressed against the brake disc 12 to generate electric braking force. As such, a common use wheel brake mechanism can be provided which generates braking force for both actuation of the hydraulic brake device and operation of the EPB 2.

The vehicle brake device of the embodiment is configured so that a current detection value (also simply referred to below as a "current value") can be confirmed by a current sensor (not illustrated) that detects the current of the motor 10 to confirm a generation state of electric braking force by the EPB 2 and this current detection value can be recognized.

An anteroposterior G sensor 25 detects G (acceleration) in an anteroposterior direction (traveling direction) of the vehicle and transmits a detection signal to the EPB-ECU 9.

An M/C pressure sensor 26 detects M/C pressure in the M/C 5 and transmits a detection signal to the EPB-ECU 9.

A wheel speed sensor 29 detects the rotation speed of each wheel and transmits a detection signal to the EPB-ECU 9. Although one wheel speed sensor 29 is actually provided for each wheel, detailed illustration and description are omitted here.

The EPB-ECU 9 is composed of a known microcomputer including elements such as a central processing unit (CPU), read-only memory (ROM), random-access memory (RAM), an input/output (I/O), and performs parking brake control by controlling the rotation of the motor 10 according to a program stored in the ROM or the like.

The EPB-ECU 9 receives, for example, a signal corresponding to an operation state of an operation switch (SW) 23 provided in an instrument panel (not illustrated) in the vehicle interior, and drives the motor 10 according to the operation state of the operation SW 23. Furthermore, the EPB-ECU 9 performs lock control, release control, and the like based on the current detection value of the motor 10, and recognizes based on the control state that lock control is being performed or that the wheel is in a locked state due to lock control, and that release control is being performed or that the wheel is in a released state (EPB release state) due to release control. The EPB-ECU 9 then outputs a signal for performing various displays to a display lamp 24 provided in the instrument panel.

The vehicle brake device configured as above basically performs an action of generating braking force in the vehicle by generating service braking force using the service brake 1 while the vehicle is traveling. In addition, when the vehicle is stopped by the service brake 1, the driver presses the operation SW 23 to actuate the EPB 2 to generate electric braking force, thereby performing an action of maintaining a stopped state and releasing the electric braking force thereafter. That is, when the driver operates the brake pedal 3 while the vehicle is traveling, brake hydraulic pressure generated in the M/C 5 is transmitted to the W/C 6 to generate service braking force as an action of the service brake 1. In addition, the piston 19 is moved by driving the motor 10 and the brake pad 11 is pressed against the brake disc 12 to generate electric braking force to bring the wheels into a locked state, and the brake pad 11 is separated from the brake disc 12 to release the electric braking force to bring the wheels into a released state as an action of the EPB 2.

Specifically, electric braking force is generated and released through lock and release control. In lock control, the EPB 2 is actuated by rotating the motor 10 forward and the rotation of the motor 10 is stopped at a position where a desired electric braking force can be generated in the EPB 2, and this state is maintained. From this, a desired electric braking force is generated. In release control, the EPB 2 is actuated by rotating the motor 10 in reverse, and the electric braking force generated in the EPB 2 is released.

Even when the vehicle is traveling, the EPB 2 can be used in times such as an emergency, during automatic driving, or when the hydraulic brake device fails. In the present embodiment, overheating of the hydraulic brake device is also suppressed by using not only the hydraulic brake device but also the EPB 2 during DAC.

Figure 3:
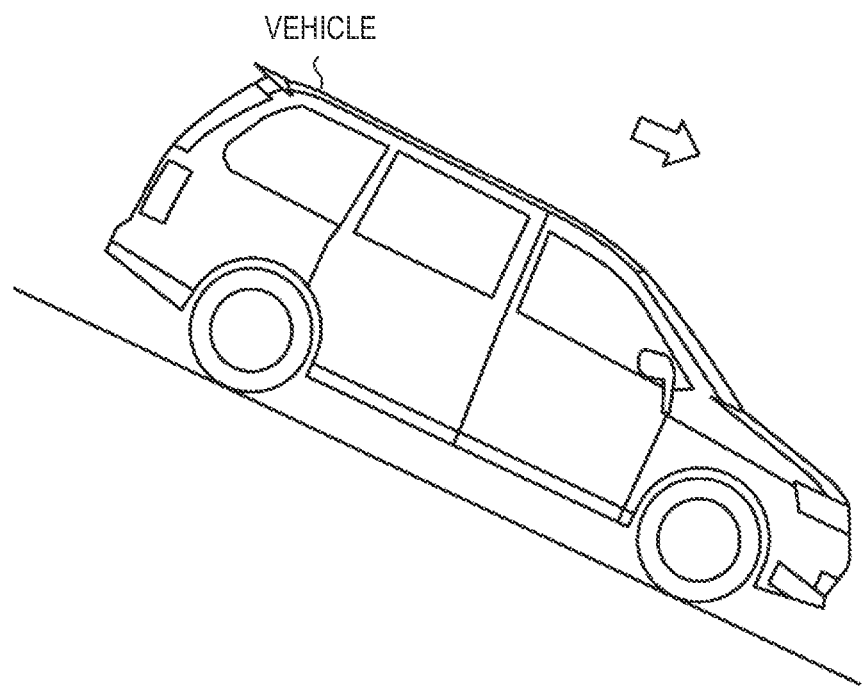
FIG. 3 is a diagram schematically illustrating a state of a vehicle traveling on a downhill road.

Here, DAC is described with reference to FIG. 3. FIG. 3 is a diagram schematically illustrating a state of the vehicle traveling on a downhill road. As described above, when the vehicle is traveling on a downhill road, DAC controls braking force so as to avoid slip and locking of the wheels and maintains vehicle speed within a target vehicle speed range. From this, the driver can concentrate on steering operation.

In the prior art, it is necessary to adjust the braking force during DAC according to the traveling state including the speed and acceleration of the vehicle. That is, the motor of the hydraulic brake device is continuously actuated. As such, the hydraulic brake device may overheat due to continuous actuation for an extended period.

The following describes a technique by which overheating of the hydraulic brake device during DAC can be suppressed in a vehicle equipped with both a hydraulic brake device and an electric brake device.

When the vehicle is traveling on a downhill road during DAC, the ESC-ECU 8 controls the ESC-ACT 7 to adjust hydraulic braking force so that the vehicle speed falls within the target vehicle speed range (refer to FIG. 1). Then, when at least one of the vehicle speed and the hydraulic pressure is stabilized, the EPB-ECU 9 controls the ESC-ACT 7 and the EPB 2 (electric brake device) to replace the hydraulic braking force with electric braking force.

When, after the hydraulic braking force is replaced with the electric braking force, the gradient of the downhill road on which the vehicle is traveling increases and the vehicle speed exceeds the target vehicle speed range (condition 1), or/and when the vehicle acceleration exceeds a first predetermined value (condition 2), the ESC-ECU 8 controls the ESC-ACT 7 to adjust the hydraulic braking force so that the vehicle speed falls within the target vehicle speed range when the vehicle speed exceeds the target vehicle speed range, and so that the vehicle acceleration becomes equal to or smaller than the first predetermined value when the vehicle acceleration exceeds the first predetermined value. Note that in the following examples of FIGS. 4A-4C, 5A-5C, 6A-6C and 7, only condition 1 out of conditions 1 and 2 is adopted in order to simplify the description, but condition 2 may be used.

When at least one of the vehicle speed and the hydraulic pressure is stabilized (condition 3) or/and the absolute value of the vehicle deceleration becomes equal to or smaller than a second predetermined value (condition 4), the EPB-ECU 9 controls the ESC-ACT 7 and the EPB 2 to replace the hydraulic braking force with electric braking force. Note that in the following examples of FIGS. 4A-4C, 5A-5C, 6A-6C and 7, only condition 3 out of conditions 3 and 4 is adopted in order to simplify the description, but condition 4 may be used.

When the gradient of the downhill road on which the vehicle is traveling decreases and the vehicle speed falls below the target vehicle speed range after the hydraulic braking force is replaced with the electric braking force, the EPB-ECU 9 controls the EPB 2 to reduce the electric braking force so that the vehicle speed falls within the target vehicle speed range. This is described below in detail with reference to FIGS. 4A-4C, 5A-5C, 6A-6C and 7.

Figure 4:
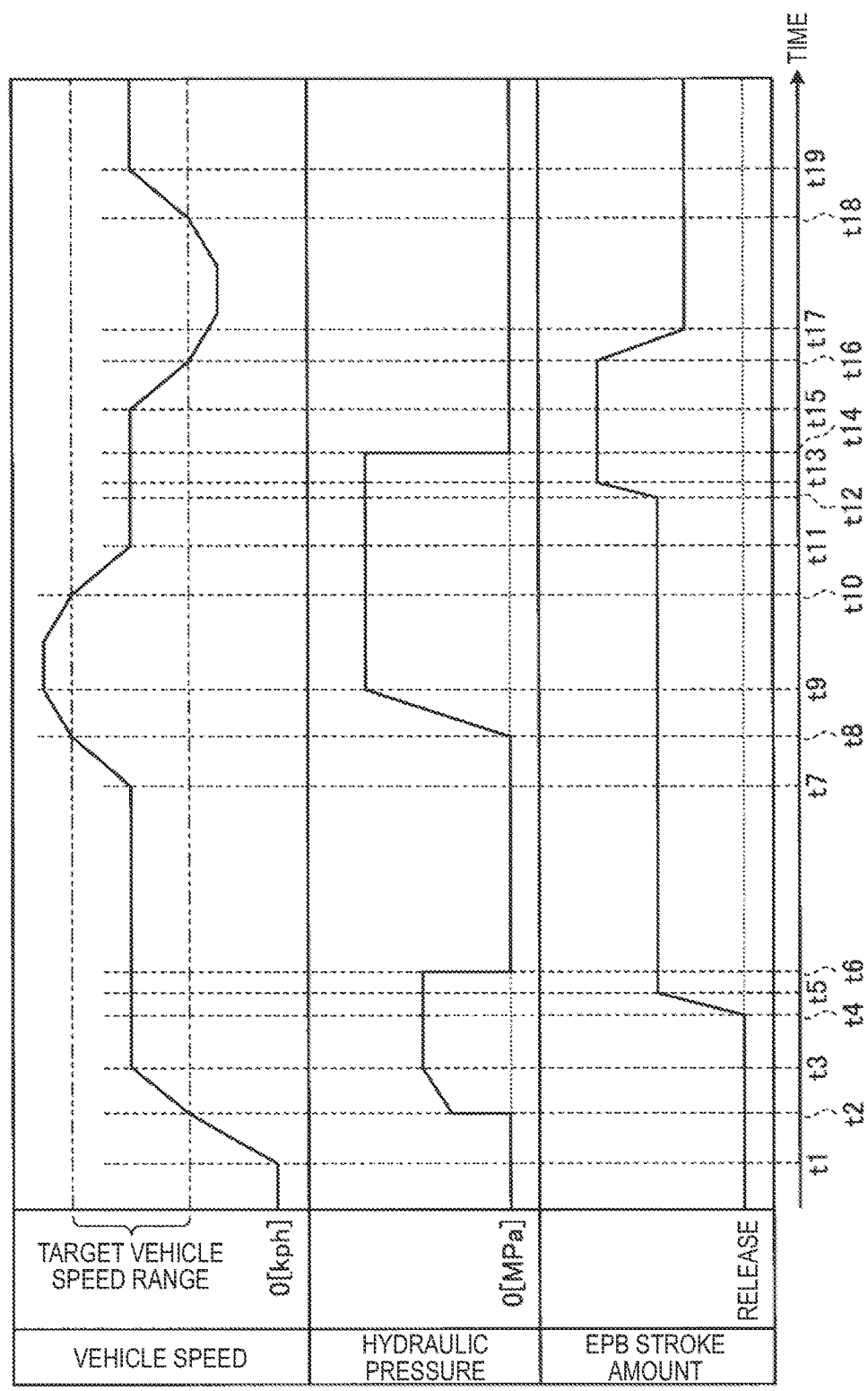
FIGS. 4A to 4C are graphs schematically illustrating a state of temporal change in each piece of information during DAC in the embodiment.

FIGS. 4A to 4C are graphs schematically illustrating a state of temporal change in each piece of information during DAC in the embodiment. In the graph of FIGS. 4A to 4C, the horizontal axis represents time. The vertical axis in FIG. 4A represents vehicle speed (kph: kilometers per hour). The vertical axis in FIG. 4A represents the hydraulic pressure (MPa) in the hydraulic brake device generated by an instruction from the ESC-ECU 8. The vertical axis in FIG. 4C represents the stroke amount (movement amount of the propulsion shaft 18 (FIG. 2)) of the EPB 2 acting according to an instruction from the EPB-ECU 9.

At time t1, the vehicle starts traveling on a downhill road. Then, at time t2, the vehicle speed reaches the lower limit value of the target vehicle speed range, and hydraulic braking force is generated. Thereafter, after the hydraulic braking force increases, at least one of the vehicle speed and the hydraulic pressure is stabilized from time t3 to time t4, and the EPB 2 starts to actuate at time t4. Then, at time t5, the clearance C1 (FIG. 2) of the EPB 2 becomes 0. Thereafter, when the hydraulic braking force is set to 0 at time t6, the hydraulic braking force is replaced with electric braking force. That is, since the clearance C1 (FIG. 2) of the EPB 2 is 0, electric braking force equivalent to the hydraulic braking force is generated even if the hydraulic pressure becomes 0.

Thereafter, at time t7, the gradient of the downhill road on which the vehicle is traveling increases, and the vehicle speed starts to increase. Then, at time t8, the vehicle speed exceeds the upper limit value of the target vehicle speed range. Thus, hydraulic braking force is generated so that the vehicle speed falls within the target vehicle speed range. Thereafter, the hydraulic pressure is stabilized at time t9. Note that the clearance C1 (FIG. 2) of the EPB 2 increases due to the generation of hydraulic braking force from time t8 onward.

Then, at time t10, the vehicle speed falls into the target vehicle speed range. Thereafter, at least one of the vehicle speed and the hydraulic pressure is stabilized from time t11 to time t12, and the EPB 2 starts to actuate at time t12. Then, at time t13, the clearance C1 (FIG. 2) of the EPB 2 becomes 0.

Then, when the hydraulic braking force is set to 0 at time t14, the hydraulic braking force is replaced with electric braking force. That is, since the clearance C1 (FIG. 2) of the EPB 2 is 0, electric braking force equivalent to the hydraulic braking force is generated even if the hydraulic pressure becomes 0.

Thereafter, at time t15, the gradient of the downhill road on which the vehicle is traveling decreases, and the vehicle speed starts to decrease. Then, at time t16, the vehicle speed falls below the lower limit value of the target vehicle speed range. Thus, the electric braking force is reduced so that the vehicle speed falls within the target vehicle speed range.

Thereafter, the electric braking force is held at time t17. From this, the vehicle speed falls into the target vehicle speed range at time t18, and thereafter, the vehicle speed is stabilized from time t19 onward.

Figure 5:
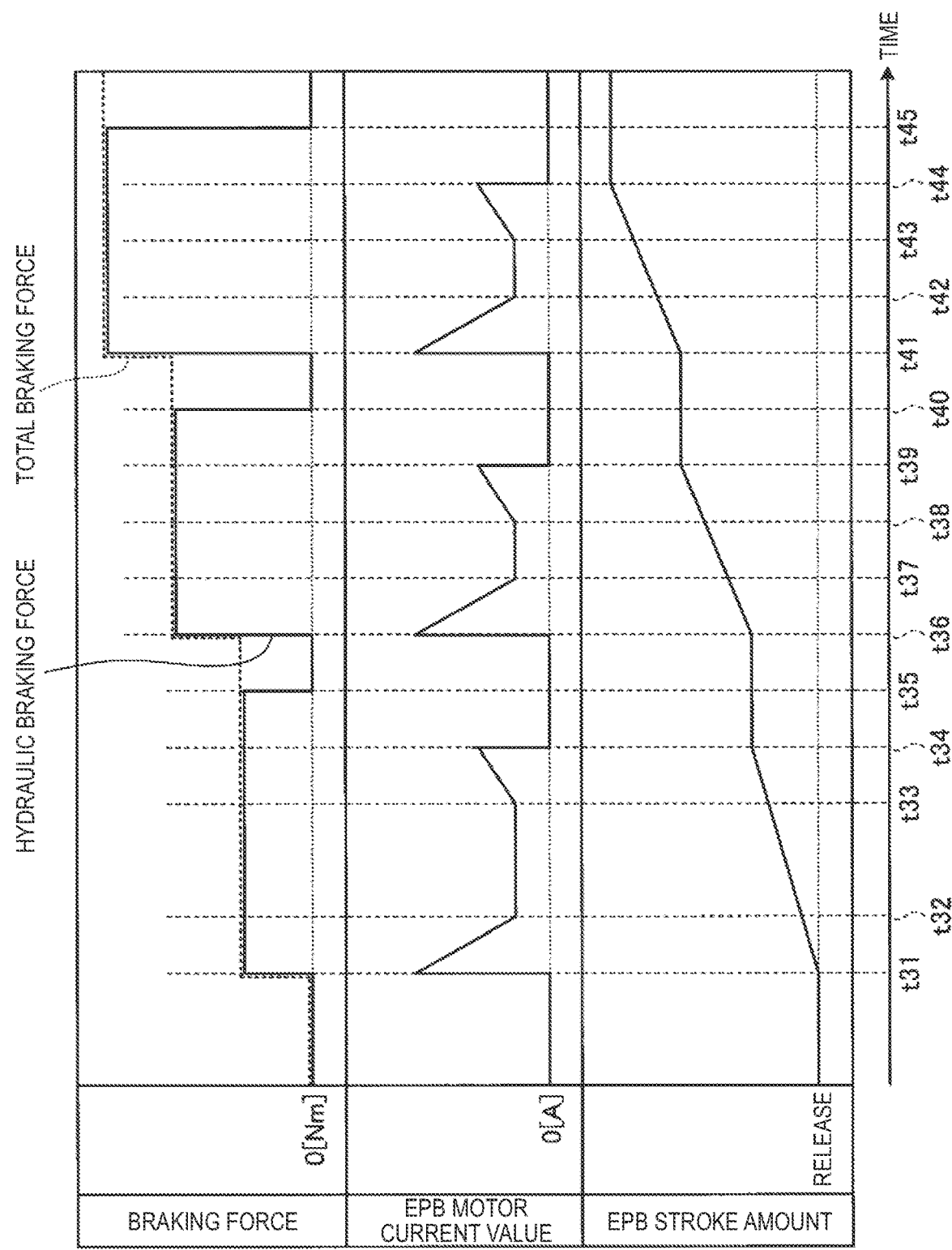
FIGS. 5A to 5C are graphs schematically illustrating the state of temporal change in each piece of information in a case where braking force is increased during DAC in the embodiment.

Next, the state of temporal change of each piece of information in a case where braking force is increased during DAC is described with reference to FIGS. 5A to 5C. FIGS. 5A to 5C are graphs schematically illustrating the state of temporal change in each piece of information in a case where braking force is increased during DAC in the embodiment.

In the graph of FIGS. 5A to 5C, the horizontal axis represents time. The vertical axis in FIG. 5A represents braking force (Nm: Newton meter). The vertical axis in FIG. 5B represents an EPB motor current value (a current value of the motor 10 of the EPB 2) generated by an instruction from the EPB-ECU 9. The vertical axis in FIG. 5C represents the stroke amount (movement amount of the propulsion shaft 18 (FIG. 2)) of the EPB 2 acting according to an instruction from the EPB-ECU 9.

Hydraulic braking force is generated from time t31 to time t35. At the same time, the EPB motor current value rapidly increases due to inrush current at time t31, temporarily stabilizes at time t32, then increases from time t33 to time t34 due to the propulsion shaft 18 abutting the piston 19

(that is, the clearance C1 in FIG. 2 becoming 0), and becomes 0 at time t34. However, the increase in the EPB motor current value from time t33 to time t34 is for determining that the clearance C1 (FIG. 2) has become 0, and is not for intentionally increasing electric braking force.

When the hydraulic braking force is set to 0 at time t35, the hydraulic braking force is replaced with electric braking force. That is, since the clearance C1 (FIG. 2) of the EPB 2 is 0, electric braking force equivalent to the hydraulic braking force is generated even if the hydraulic pressure becomes 0. Accordingly, the total braking force is equivalent before and after time t35. Note that the hydraulic braking force and the EPB motor current value are not intentionally simultaneously generated at time t31, and the EPB motor current value may be generated after the hydraulic braking force (hereinafter, the same shall apply).

Thereafter, when the total braking force is increased, the hydraulic braking force is increased at time t36. This hydraulic braking force is maintained from time t36 to time t40. At the same time, the EPB motor current value rapidly increases due to inrush current at time t36, temporarily stabilizes at time t37, then increases from time t38 to time t39 due to the clearance C1 in FIG. 2 becoming 0, and becomes 0 at time t39.

When the hydraulic braking force becomes 0 at time t40, the hydraulic braking force is replaced with electric braking force. That is, since the clearance C1 (FIG. 2) of the EPB 2 is 0, electric braking force equivalent to the hydraulic braking force is generated even if the hydraulic pressure becomes 0. Accordingly, the total braking force is equivalent before and after time t40.

Thereafter, when the total braking force is increased, the hydraulic braking force is increased at time t41. This hydraulic braking force is maintained from time t41 to time t45. At the same time, the EPB motor current value rapidly increases due to inrush current at time t41, temporarily stabilizes at time t42, then increases from time t43 to time t44 due to the clearance C1 (FIG. 2) becoming 0, and becomes 0 at time t44.

When the hydraulic braking force becomes 0 at time t45, the hydraulic braking force is replaced with electric braking force. That is, since the clearance C1 (FIG. 2) of the EPB 2 is 0, electric braking force equivalent to the hydraulic braking force is generated even if the hydraulic pressure becomes 0. Accordingly, the total braking force is equivalent before and after time t45.

In this way, when at least one of the vehicle speed and the hydraulic pressure is stabilized after the hydraulic braking force is generated during DAC, the hydraulic braking force is replaced with electric braking force, so that the total braking force can be maintained while temporarily stopping the ESC-ACT 7 or the hydraulic brake device.

Figure 6:
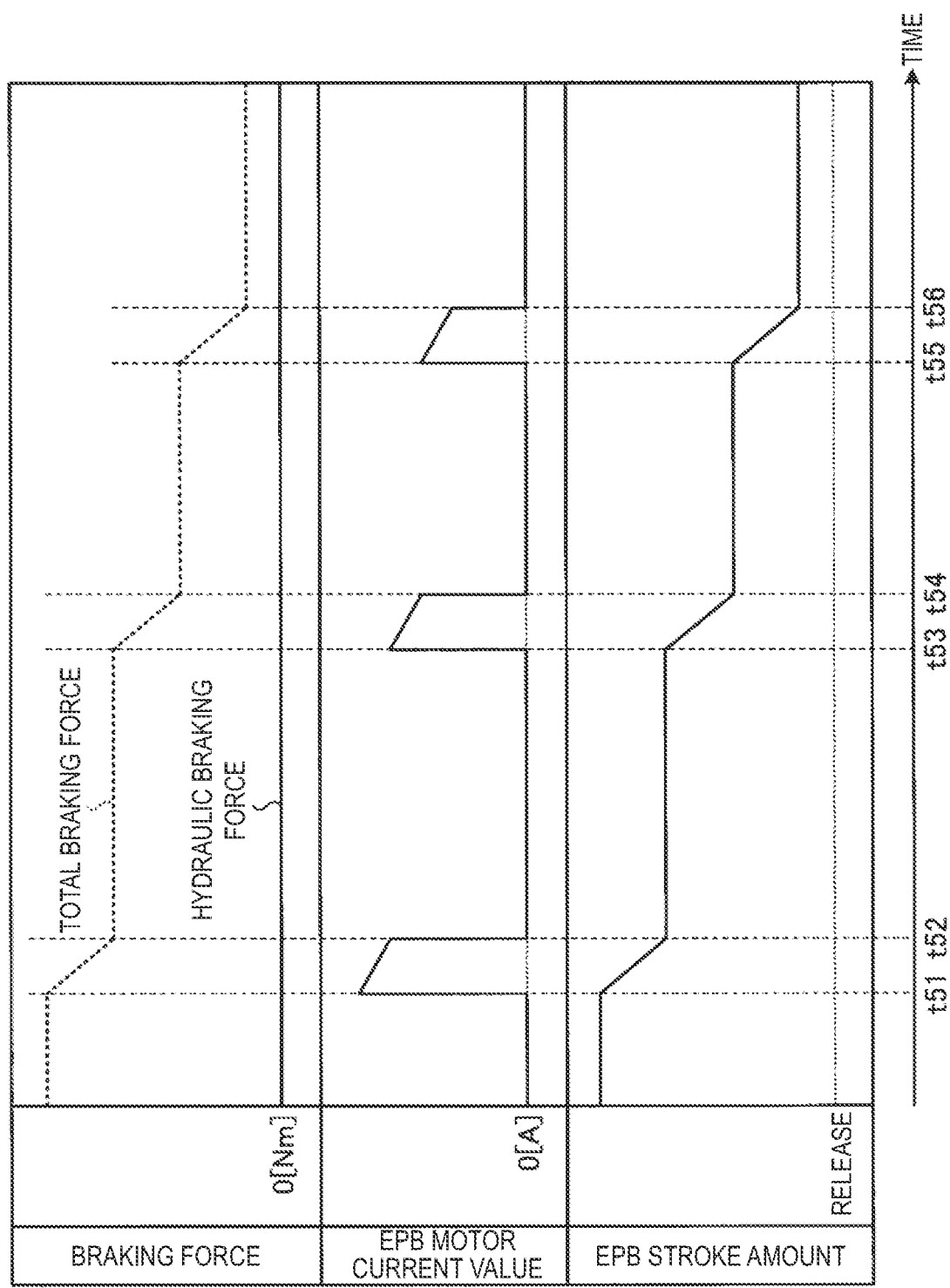
FIGS. 6A to 6C are graphs schematically illustrating the state of temporal change in each piece of information in a case where braking force is reduced during DAC in the embodiment.

Next, the state of temporal change of each piece of information in a case where braking force is reduced during DAC will be described with reference to FIGS. 6A to 6C. FIGS. 6A to 6C are graphs schematically illustrating the state of temporal change in each piece of information in a case where braking force is reduced during DAC in the embodiment. The contents of the vertical axis and the horizontal axis in FIGS. 6A to 6C are the same as those in FIGS. 5A to 5C.

First, it is assumed that electric braking force is generated before time t51. Furthermore, the hydraulic braking force is always 0. When the electric braking force is reduced at time t51, the EPB motor current value is reduced to a predetermined current value by time t52 (or may be reduced for a predetermined period of time, hereinafter the same shall apply) and is then set to 0. From this, the EPB stroke amount and the total braking force (=electric braking force) decrease. Thereafter, the total braking force is maintained until time t53.

When the electric braking force is reduced at time t53, the EPB motor current value is reduced to a predetermined current value by time t54 and is then set to 0. From this, the EPB stroke amount and the total braking force (=electric braking force) decrease. Thereafter, the total braking force is maintained until time t55.

When the electric braking force is reduced at time t55, the EPB motor current value is reduced to a predetermined current value by time t56 and is then set to 0. From this, the EPB stroke amount and the total braking force (=electric braking force) decrease. Thereafter, the total braking force is maintained.

In this way, in a case where the total braking force is reduced after replacing hydraulic braking force with electric braking force during DAC, it is only necessary to reduce the electric braking force, and it is not necessary to generate the hydraulic braking force.

Figure 7:
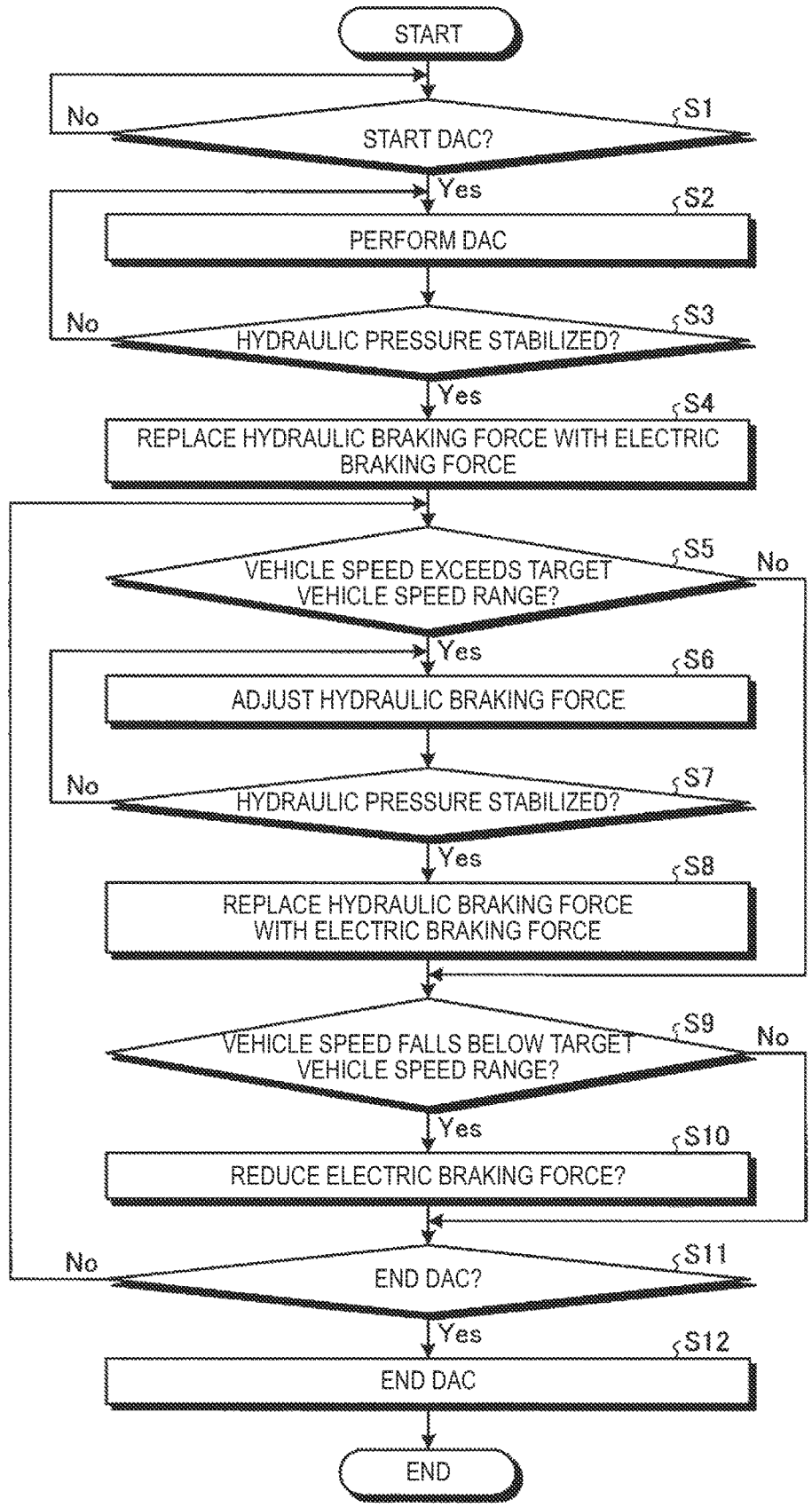
FIG. 7 is a flowchart depicting processing by a braking control device of the embodiment.

Next, processing by the braking control device is described with reference to FIG. 7. FIG. 7 is a flowchart depicting the processing by the braking control device (ESC-ECU 8 and EPB-ECU 9) of the embodiment.

First, in Step S1, the ESC-ECU 8 determines whether or not a DAC start operation has been performed by a user. The processing proceeds to Step S2 when Yes and returns to Step S1 when No.

In Step S2, the ESC-ECU 8 performs DAC. That is, the ESC-ECU 8 controls the ESC-ACT 7 to adjust hydraulic braking force so that the vehicle speed falls within the target vehicle speed range.

Next, in Step S3, the EPB-ECU 9 determines whether or not the hydraulic pressure or the vehicle speed has stabilized. The processing proceeds to Step S4 when Yes and returns to Step S2 when No.

In Step S4, the EPB-ECU 9 controls the ESC-ACT 7 and the EPB 2 to replace the hydraulic braking force with electric braking force (time t6 in FIGS. 4A to 4C).

Next, in Step S5, the EPB-ECU 9 determines whether or not the vehicle speed exceeds the target vehicle speed range. The processing proceeds to Step S6 when Yes and proceeds to Step S9 when No.

In Step S6, the ESC-ECU 8 controls the ESC-ACT 7 to adjust the hydraulic braking force so that the vehicle speed falls within the target vehicle speed range.

Next, in Step S7, the EPB-ECU 9 determines whether or not the hydraulic pressure or the vehicle speed has stabilized. The processing proceeds to Step S8 when Yes and returns to Step S6 when No.

In Step S8, the EPB-ECU 9 controls the ESC-ACT 7 and the EPB 2 to replace the hydraulic braking force with electric braking force (time t14 in FIGS. 4A to 4C).

In Step S9, after No in Step S5 and after Step S8, the EPB-ECU 9 determines whether or not the vehicle speed falls below the target vehicle speed range. The processing proceeds to Step S10 when Yes and proceeds to Step S11 when No.

In Step S10, the EPB-ECU 9 controls the EPB 2 to reduce the electric braking force so that the vehicle speed falls within the target vehicle speed range (times t16 to t17 in FIGS. 4A to 4C).

In Step S11, after No in Step S9 and after Step S10, the ESC-ECU 8 determines whether or not the user has performed a DAC end operation. The processing proceeds to Step S12 when Yes and returns to Step S5 when No. In Step S12, the braking control device ends DAC.

In this way, according to the braking control device (ESC-ECU 8 and EPB-ECU 9) of the present embodiment, when at least one of the vehicle speed and the hydraulic pressure is stabilized after hydraulic braking force is first generated during DAC, the hydraulic braking force is replaced with electric braking force so that overheating of the hydraulic brake device can be suppressed. For a specific example, in FIGS. 4A to 4C, even during DAC, overheating of the hydraulic brake device can be suppressed by stopping the action of the hydraulic brake device (ESC-ACT 7) from time t6 to time t8 or from time t14 onward.

In addition, during DAC, not electric braking force but hydraulic braking force with excellent responsiveness is generated at first. Thereafter, when the vehicle speed or the hydraulic pressure is stabilized, the hydraulic braking force is replaced with electric braking force which is excellent for maintaining braking force. From this, overheating of the hydraulic brake device can be suppressed without reducing braking responsiveness as compared with the prior art.

In addition, in the prior art, in order to suppress overheating of the hydraulic brake device during DAC, for example, measures are taken to suppress performance or actuation time. According to the braking control device of the present embodiment, the necessity of such measures is reduced. From this, time in which DAC can continue can be increased.

When the gradient of a downhill road increases and the vehicle speed exceeds the target vehicle speed range after hydraulic braking force is replaced with electric braking force, the hydraulic braking force is first adjusted so that the vehicle speed falls within the target vehicle speed range. Thereafter, when at least one of the vehicle speed and the hydraulic pressure is stabilized, the hydraulic braking force is replaced with the electric braking force, so that it is possible to flexibly counter the increase in the gradient of the downhill road.

When the gradient of a downhill road on which the vehicle is traveling decreases and the vehicle speed falls below the target vehicle speed range after hydraulic braking force is replaced with electric braking force, the electric brake device is controlled to reduce the electric braking force so that the vehicle speed falls within the target vehicle speed range, thus making it possible to flexibly counter the decrease in the gradient of the downhill road.

Although an embodiment of the present disclosure has been exemplified above, the above embodiment is merely an example, and is not intended to limit the scope of the disclosure. The above embodiment can be implemented in various other forms, and various omissions, substitutions, combinations, and changes can be made within a scope not departing from the gist of the disclosure. In addition, specifications (structure, type, number, and the like) of each configuration, shape, and the like can be appropriately changed and implemented.

For example, in the above embodiment, a case of an EPB-type disc brake has been described as an example, but the present embodiment can also be applied to an EPB-type drum brake.

Furthermore, in the above embodiment, a case where hydraulic braking force for four wheels is replaced with electric braking force has been described, but the present disclosure is not limited as such. In addition, for example, when the EPB is mounted on the two rear wheels, hydraulic braking force for the two rear wheels may be replaced with electric braking force, and hydraulic braking force for the two front wheels may be the same as in the prior art. Also in this case, the effect of suppressing overheating due to a decrease in the actuation time of the motor and solenoids (various control valves) in the hydraulic brake device can be obtained.

The invention claimed is:

1. A braking control device for application in a vehicle, the braking control device comprising:
   a hydraulic brake device configured to press a braking member using hydraulic pressure toward a braked member that rotates integrally with a wheel to generate hydraulic braking force;
   an electric brake device configured to press the braking member using driving force of a motor toward the braked member to generate electric braking force;
   an ESC-ECU configured to adjust the hydraulic braking force by controlling the hydraulic brake device so that a vehicle speed falls within a target vehicle speed range while the vehicle is traveling on a downhill road even without depression of a brake pedal by a driver; and
   an EPB-ECU configured to, when at least one of the vehicle speed and the hydraulic pressure is stabilized, control the hydraulic brake device and the electric brake device to replace the hydraulic braking force with the electric braking force, wherein
   when the vehicle speed exceeds the target vehicle speed range due to an increase in a gradient of the downhill road on which the vehicle is traveling after the hydraulic braking force is replaced with the electric braking force, the braking control device
   controls the hydraulic brake device to adjust the hydraulic braking force so that the vehicle speed falls within the target vehicle speed range when the vehicle speed exceeds the target vehicle speed range, and thereafter
   when at least one of the vehicle speed and the hydraulic pressure is stabilized or/and an absolute value of vehicle deceleration becomes equal to or smaller than a second predetermined value, controls the hydraulic brake device and the electric brake device to replace the hydraulic braking force with the electric braking force.

2. The braking control device according to claim 1, wherein
   the hydraulic brake device and the electric brake device have a common piston that can press the braking member using hydraulic pressure and the driving force of the motor, and the electric brake device has a propulsion shaft that can be brought into contact with and separated from the piston and that can press the piston toward the braking member using the driving force of the motor in a state in which the propulsion shaft is in contact with the piston, and the braking control device controls the hydraulic brake device to reduce the hydraulic braking force to 0 in a state in which the propulsion shaft is in contact with the piston, thereby the hydraulic braking force being replaced with the electric braking force.

3. The braking control device according to claim 1, wherein
   the braking control device controls the hydraulic brake device to reduce the hydraulic braking force to 0 in a state in which the electric brake device generates the electric braking force, thereby the hydraulic braking force being replaced with the electric braking force.

4. A braking control device for application in a vehicle, the braking control device comprising:

a hydraulic brake device configured to press a braking member using hydraulic pressure toward a braked member that rotates integrally with a wheel to generate hydraulic braking force;

an electric brake device configured to press the braking member using driving force of a motor toward the braked member to generate electric braking force;

an ESC-ECU configured to adjust the hydraulic braking force by controlling the hydraulic brake device so that a vehicle speed falls within a target vehicle speed range while the vehicle is traveling on a downhill road even without depression of a brake pedal by a driver; and an EPB-ECU configured to, when at least one of the vehicle speed and the hydraulic pressure is stabilized, control the hydraulic brake device and the electric brake device to replace the hydraulic braking force with the electric braking force, wherein when vehicle acceleration exceeds a first predetermined value due to an increase in a gradient of the downhill road on which the vehicle is traveling after the hydraulic braking force is replaced with the electric braking force, the braking control device controls the hydraulic brake device to adjust the hydraulic braking force so that the vehicle acceleration becomes equal to or smaller than the first predetermined value when the vehicle acceleration exceeds the first predetermined value, and thereafter when at least one of the vehicle speed and the hydraulic pressure is stabilized or/and an absolute value of vehicle deceleration becomes equal to or smaller than a second predetermined value, controls the hydraulic brake device and the electric brake device to replace the hydraulic braking force with the electric braking force.

5. A braking control device for application in a vehicle, the braking control device comprising:

a hydraulic brake device configured to press a braking member using hydraulic pressure toward a braked member that rotates integrally with a wheel to generate hydraulic braking force;

an electric brake device configured to press the braking member using driving force of a motor toward the braked member to generate electric braking force;

an ESC-ECU configured to adjust the hydraulic braking force by controlling the hydraulic brake device so that a vehicle speed falls within a target vehicle speed range while the vehicle is traveling on a downhill road even without depression of a brake pedal by a driver; and an EPB-ECU configured to, when at least one of the vehicle speed and the hydraulic pressure is stabilized, control the hydraulic brake device and the electric brake device to replace the hydraulic braking force with the electric braking force, wherein when the vehicle speed falls below the target vehicle speed range due to a decrease in a gradient of the downhill road on which the vehicle is traveling after the hydraulic braking force is replaced with the electric braking force, the braking control device controls the electric brake device to reduce the electric braking force so that the vehicle speed falls within the target vehicle speed range.

* * * * *